Nov. 15, 1949     W. E. HAPPEL     2,488,402
CONTROL SYSTEM
Filed Dec. 12, 1945
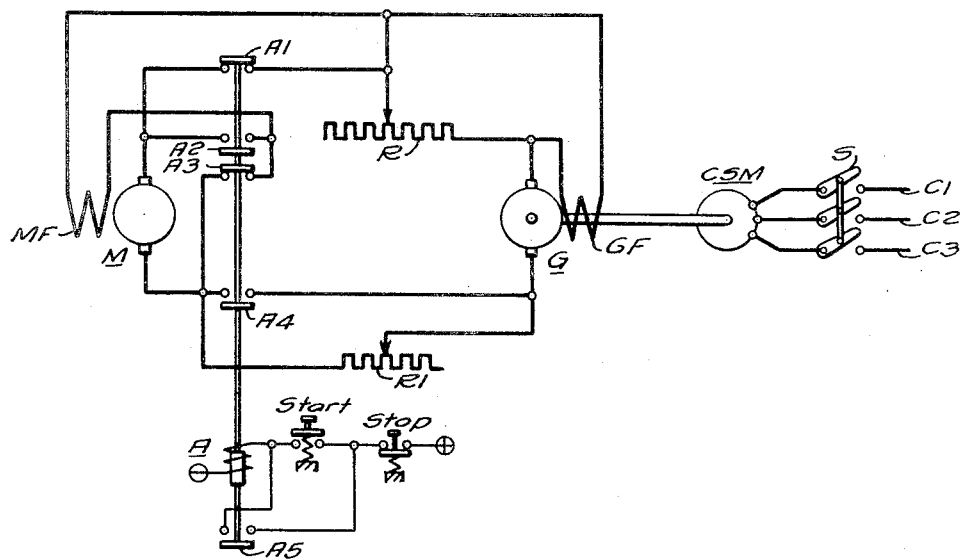
WITNESSES:
INVENTOR
William E. Happel.
BY
ATTORNEY Patented Nov. 15, 1949

2,488,402

UNITED STATES PATENT OFFICE 2,488,402

CONTROL SYSTEM

William E. Happel, Waynesboro, Pa., assignor to Landis Tool Company, Waynesboro, Pa., a corporation of Pennsylvania Application December 12, 1945, Serial No. 634,545

12 Claims. (Cl. 318—140)

This invention relates generally to series variable voltage drives, and more particularly to a series variable voltage motor and generator drive in which the motor and generator are each of the series wound type and are of substantially equal rating.

In certain of its aspects, this invention is related to the copending applications of William E. Happel, the inventor in this application, Serial Numbers 634,544 and 634,546, both filed on the same date as this application and entitled Control system, each application being assigned to the same assignee as this invention.

As a general rule, series variable voltage drives are characterized by a marked slowness in build-up of the series generator output at low field strength and poor dynamic braking characteristics at low motor speed. Measurable improvements in these respects can be realized in part by proper excitation control of the motor series field during dynamic braking and in part through proper control of the series generator output to maintain an active magnetic circuit in the generator during periods when the motor is stopped. This invention utilizes these basic principles to obtain the desired operating characteristics of the system.

One object of this invention is to provide a variable voltage drive embodying a series connected series motor and series generator system having effective dynamic braking over the entire speed range of the motor and particularly at low motor speeds.

Another and equally important object of this invention is to provide a series variable voltage drive of the type mentioned in which quick motor starting particularly at low motor speeds is obtained.

Yet another object of this invention is to provide a series connected series motor and series generator system which combines the characteristics of quick motor starting and effective dynamic braking of the motor.

The foregoing objects are merely illustrative of the various aims and objects of this invention. Other objects and advantages will become apparent upon a study of the following specification when considered in conjunction with the accompanying drawing, in which the single figure thereof illustrates a variable voltage series motor and series generator system embodying the principles of this invention.

In the figure, M designates a series motor and G designates a series generator. The two dynamoelectric machines are usually, although not necessarily, of the same frame size and thus have comparable ratings. Each machine is provided with a series field winding, that for the motor being designated MF and that for the generator being designated GF. The machines are connected in a series loop circuit. Generator G is driven by a suitable constant speed motor CSM which, by way of illustration but not limitation, may be an induction motor adapted for connection to the alternating-current supply conductors C1, C2 and C3 through the switch S.

In order to simplify the illustration of this invention the usual control and protective devices normally incorporated in a system of the type disclosed have been eliminated. It is to be understood, however, that devices of the character mentioned may be incorporated in the system of this invention without departing from the spirit and scope thereof.

In keeping with the foregoing, there is illustrated a simple arrangement including the rheostat R for controlling the field strength of the generator and, hence, controlling the output of the generator. This rheostat is located in a circuit which shunts the generator series field GF. The rheostat R carries a portion of the generator load current and thus has a voltage drop thereacross in dependence of the load current. Movement of the adjustable tap to insert more of the rheostat R into the shunt circuit increases the voltage drop thereacross and increases the generator series field excitation, while movement of the tap in the opposite direction decreases the shunt circuit resistance and weakens the generator series field.

Specifically, dynamic braking and quick starting are obtained by short-circuiting the generator load circuit and the at same time reversing the connection of the motor armature with respect to the motor series field such that the regenerative currents of the motor armature circulate through its series field in the same direction as the generator currents. Simultaneously a load resistance is inserted in the generator load circuit to hold the generator output at some desirable value to maintain an active generator magnetic circuit when the motor armature winding is shorted out of the generator load circuit and also to cause the circulation of a predetermined current through the motor series field to aid dynamic braking.

These control principles are embodied in the circuit system controlled by relay A, the coil of which is connected between the positive and negative terminals indicated through the Start and Stop push buttons. This relay is provided with the contacts numbered A1 to A5, inclusive, of which contacts A1 and A3, when closed, reverse the connection of the motor armature winding with respect to the motor series field winding, the contacts A3 functioning additionally to short the generator load circuit. Contacts A2 and A4, when closed, connect the motor and generator in the conventional series loop to effect motor operation. Contacts A5 shunt the Start push button and maintain an energizing circuit for the coil of relay A which is independent of the position of the Start button.

Assuming that the switch S is closed and the generator G is running at normal speed, operation of the system is effected by pressing the Start push button. This energizes relay A causing its contacts A2, A4 and A5 to close. Closure of contacts A2 and A4 completes the conventional series motor generator loop circuit and drives the motor at a speed corresponding to the setting of the rheostat R.

When the Stop push button is pressed, relay A assumes the position indicated in the drawing. Contacts A1 and A3 now are closed to reverse the connection of the motor armature with respect to its series field and to short-circuit the generator load circuit. The motor series field and the generator series field remain in the generator load circuit. Contacts A2 and A4 open to open the motor generator series loop connection. Opening of contacts A4 also inserts the circuit branch containing resistor R1, paralleling these contacts into the load circuit of the generator. Resistor R1 is of sufficient ohmic value to impose a slight electrical load on the generator when inserted in the now established generator load circuit.

With the connections just described, dynamic braking of the motor results from the opposed magnetic forces produced by the motor series field flux and the armature flux resulting from the regenerative armature currents circulating in the loop circuit, including the motor armature, contacts A1, series field MF and the contacts A3. The dynamic braking force is relatively strong for the reason the motor series field flux is strong, its excitation being maintained, in part, due to the inductance thereof which delays its collapse, in part, due to the regenerative motor armature currents circulating therethrough and, in part, due to the generator currents circulating therethrough.

In view of the active load circuit maintained on the generator, the magnetic circuit of the generator remains active when the motor is dynamically braked to rest. It is, therefore, unnecessary to wait for the generator to build up an active magnetic circuit when the starting cycle of the motor is initiated. Another characteristic tending to speed up starting results from the fact that a controlled exciting current from the generator is flowing in the motor series field when the motor is at rest.

The foregoing disclosure and the showing made in the drawing are merely illustrative of the principles of this invention and are not to be considered in a limiting sense. The only limitations are to be determined from the scope of the appended claims.

I claim as my invention:

1. An electrical system comprising, in combination, a motor having an armature winding and a series field winding, a generator having an armature winding and a series field winding, switching means operable to each of two positions, said switching means in one position connecting said motor and generator in series circuit relation, means for controlling the excitation at least of said generator series field winding, and said switching means in the other of said two positions connecting the series field winding of said motor in a loop circuit with said generator in parallel with the armature winding of said motor, such that regenerative motor currents circulate through the motor series field winding in the same direction as the generator currents.

2. An electrical system comprising, in combination, a motor having an armature winding and a series field winding, a generator having an armature winding and a series field winding, switching means operable to each of two positions, said switching means in one position connecting said motor and generator in series circuit relation, and said switching means in the other of said two positions connecting the series field winding of said motor in a loop circuit with said generator in parallel with the armature winding of said motor, such that regenerative motor currents circulate through the motor series field winding in the same direction as the generator currents.

3. An electrical system comprising, in combination, a motor having an armature winding and a series field winding, a generator having an armature winding and a series field winding, circuit means connecting said motor and generator in series circuit relation, control means for stopping said motor including circuit means for reversing the connection of said motor armature winding with respect to the motor series field winding to stop said motor, means forming an electrical load, and circuit means connecting said series field winding and said means forming an electrical load in series with said generator, for applying a predetermined electrical load on said generator when said motor connections are reversed.

4. An electrical system comprising, in combination, a motor having an armature winding and a series field winding, a generator having an armature winding and a series field winding, circuit means connecting said motor and generator in series circuit relation, circuit means for reversing the connection of the motor armature winding with respect to the motor series field winding, an electrical load, and circuit means for simultaneously introducing said electrical load into the generator load circuit upon reversing of the connection of the motor armature winding.

5. An electrical system comprising, in combination, a motor having an armature winding and a series field winding, a generator having an armature winding and a series field winding, contact means operable to each of two contacting positions, resistor means, said contact means in one position being operative to connect said motor and generator in series circuit relation, said contact means in the other position being operative to reverse the connection of the motor armature winding with respect to the motor series field winding, and connecting said resistor means with the motor series field winding and the generator in a loop circuit paralleling the motor armature winding.

6. A control system for a series connected motor and generator, the motor being a series motor having an armature winding and a series field winding, and the generator being a series generator having an armature winding and a series field winding comprising, in combination, control means for connecting the motor and generator in series circuit, control means for reversing the connections of the motor armature winding with respect to the series field winding, a resistor and control means connecting said generator and said resistor in a series circuit with said motor series field winding, said series circuit being in parallel with said motor armature winding.

7. A control system for a series connected motor and generator, the motor being a series motor having an armature winding and a series field winding, and the generator being a series generator having an armature winding and a series field winding comprising, in combination, control means for connecting the motor and generator in series circuit, control means for reversing the connections of the motor armature winding with respect to the series field winding, resistor means, and control means for connecting said resistor means with the series field winding for the motor in a loop circuit with the generator, said loop circuit paralleling the motor armature winding.

8. A control system for a series motor and a series generator, each having an armature winding and a series field winding, comprising in combination, means forming an electrical load, contact means operable to two positions, said contact means in one position connecting said motor and generator in series circuit relation, said contact means in the other position reversing the connection of the motor armature winding with respect to the series field winding therefor and connecting the series field winding and the means forming an electrical load in a loop circuit with the generator.

9. An electrical control system comprising, in combination, a motor having an armature winding and a series field winding, a generator having an armature winding and a series field winding, switching means operable to each of two switching positions, said switching means in one position connecting said motor and generator in series circuit relation and in the other position reversing the connection of the motor armature winding with respect to the series field winding therefor, means forming an electrical load, said switching means in said other position connecting said electrical load together with series field winding of the motor in a loop circuit with said generator, and means for controlling the excitation of the generator series field winding.

10. An electrical control system comprising, in combination, a motor having an armature winding and a series field winding, a generator having an armature winding and a series field winding, circuit means connecting the motor and generator in a loop circuit with the series field windings of the motor and generator in one side of the series loop, normally open contact means connected in the second side of the series loop, a resistor shunting the normally open contacts in the second side of the series loop, normally open contact means connected between the series field winding of the motor and the corresponding terminal of the motor armature winding, normally closed contacts connected across the series field winding of the motor and the normally open contacts associated therewith, normally closed contact means on one side connected between the series field winding of the motor and the normally open contacts associated therewith and on the other side being connected between the normally open contacts connected in the second side of the series loop and the motor armature winding, and means for substantially simultaneously actuating all of said contact means.

11. An electrical control system comprising, in combination, a motor having an armature winding and a series field winding, a generator having an armature winding and a series field winding, circuit means connecting the motor and generator in a loop circuit with the series field windings of the motor and generator in one side of the series loop, normally open contact means connected in the second side of the series loop, a resistor shunting the normally open contacts in the second side of the series loop, normally open contact means connected between the series field winding of the motor and the corresponding terminal of the motor armature winding, normally closed contacts connected across the series field winding of the motor and the normally open contacts associated therewith, normally closed contact means on one side connected between the series field winding of the motor and the normally open contacts associated therewith and on the other side being connected between the normally open contacts connected in the second side of the series loop and the motor armature winding, means for substantially simultaneously actuating all of said contact means, and an adjustable resistor connected across the series field winding of the generator for controlling the excitation thereof.

12. An electrical system comprising, in combination, a motor having an armature winding and a series field winding, a generator having an armature winding and a series field winding, switching means operable to each of two positions, said switching means in one position connecting said motor and said generator in series circuit relation, said switching means in the other of said two positions connecting the series field winding of said motor in a loop circuit with said generator in parallel with the armature winding of said motor, such that regenerative currents of said motor circulate through the motor series field winding in the same direction as the generator currents, circuit means forming an electrical load, said switching means in said other of said two positions inserting said circuit means in series circuit with said generator and in said one position shunting said circuit means from said series circuit with said generator.

WILLIAM E. HAPPEL.

REFERENCES CITED

The following references are of record in the file of this patent:

UNITED STATES PATENTS

| Number | Name | Date |
|---|---|---|
| 537,994 | Richardson | Apr. 23, 1895 |
| 2,154,279 | Muller | Apr. 11, 1939 |
| 2,366,090 | Elberty | Dec. 26, 1944 |